UNITED STATES PATENT OFFICE.

CARL KELLNER, OF VIENNA, AUSTRIA-HUNGARY.

PROCESS OF EXTRACTING ZINC FROM WASTE PRODUCTS OF ROASTED PYRITES.

SPECIFICATION forming part of Letters Patent No. 690,295, dated December 31, 1901.

Application filed October 13, 1900. Serial No. 32,996. (No specimens.)

*To all whom it may concern:*

Be it known that I, CARL KELLNER, a subject of the Emperor of Austria-Hungary, residing at Vienna, in the Province of Lower Austria, in the Empire of Austria-Hungary, have invented certain new and useful Improvements in the Process of Extraction of Zinc from the Waste Products of Roasted Pyrites; and I do hereby declare the following to be a full, clear, and exact description of the invention, such as will enable others skilled in the art to which it appertains to make and use the same.

This invention relates to a process for utilizing the waste products of roasted pyrites containing zinc. Up to the present two methods have been proposed for this purpose, one of which consisted in subjecting the ore to chloridizing roasting, and according to the other the zinc was not subjected to electrolysis as chlorid, but in some other form. In the first method — the chloridizing roasting — there is difficulty in properly carrying out the process and in the subsequent leaching and purifying, and the disadvantage in the second method is that the only valuable product separated out from the two electrolytic components by the current is the zinc, while no useful work is done by the current at the anode.

Now in the process according to this invention these difficulties are overcome by treating the waste products with sulfurous acid instead of chloridizing roasting, then converting the bisulfite formed into sulfate by means of air, decomposing this sulfate by adding the chlorid of an alkali or of an alkaline earth to form zinc chlorid and the sulfate of the alkali or alkaline earth used, and finally separating the zinc from the chlorin compound by electrolysis. Consequently when treating the waste products of roasted pyrites after the improved process, besides pure electrolytic zinc there are obtained as valuable products pure sulfate of an alkali or an alkaline earth and chlorin.

One method of carrying out the process according to this invention in practice is as follows: The ground waste products from roasted pyrites containing zinc are introduced into water, into which sulfurous acid is simultaneously passed until no more zinc goes into solution, whereupon the liquor is allowed to settle, and the solution obtained, which contains substantially bisulfite of zinc and small quantities of iron and lime as impurities, is decanted from the residuum. A current of air is passed through or over the decanted solution, which may be advantageously slightly heated, so as to convert the zinc bisulfite into zinc sulfate, which remains in solution as such, while the lime present is separated out as calcium sulfate. The removal or separation of the iron from the solution can be effected in any known manner—for example, by adding chlorid of lime or zinc oxid either before further treatment of the zinc-sulfate solution or, if desired, at a later stage in the process. The remaining zinc-sulfate solution, which is almost pure, is then mixed with chlorid of sodium for the purpose of converting the zinc sulfate into zinc chlorid—*i. e.,* into a compound which through the subsequent electrolysis yields, besides metallic zinc, chlorin that can be used for all kinds of bleaching purposes. The zinc-sulfate solution may thereupon be advantageously concentrated in a partial vacuum and cooled, so as to crystallize, when almost pure sodium sulfate, containing only traces of zinc sodium sulfate, will separate out. In order to get rid of even these traces, the salt crystallized out is dissolved in a little hot water and a quantity of hot sodium-carbonate solution is added sufficient to remove all the zinc in the form of carbonate of zinc and leave a pure sodium-sulfate solution, from which on cooling the sodium sulfate crystallizes out in a perfectly pure state.

The zinc chlorid obtained in the manner described by mixing the solution of zinc sulfate with sodium chlorid is freed in any known manner from the iron present, if this has not already been done, and is subjected to electrolysis, so as to obtain pure zinc and chlorin.

When chlorid of calcium is used in carrying out the process, insoluble calcium sulfate is obtained, which forms a valuable product for paper-mills in consequence of its fine crystalline nature.

The described process, if desired, can be carried out in the following modified manner without departing from the essence of the invention: According to this modified process instead of oxidizing the zinc-bisulfite solution obtained in the known manner by the action of aqueous sulfurous acid upon the waste products from roasted pyrites containing zinc directly to zinc sulfate by blowing air therethrough or thereover the bisulfite solution may be first heated to boiling, so as to drive off sulfurous acid, which can serve again for extracting further quantities of zinc from the waste roasting products, while the zinc is for the most part separated in the form of monosulfite, ($ZnSO_3$,) which is difficultly soluble in water. Thereupon the neutral sulfite thus obtained will be exposed to the air for the purpose of causing sulfate to be formed by spreading it out on wicker-work or dissolving it in water (with the addition of a small quantity of sulfuric acid) and passing a current of air through it. The subsequent treatment of the zinc sulfate obtained in this way can take place in a similar manner to that already described for the zinc sulfate obtained by the direct oxidation of the zinc bisulfite.

A further modification of the described process consists in that the aqueous solution of the mixture of sulfate of zinc produced in either of the manners above described with sodium chlorid is submitted to electrolysis, preferably at an increased temperature. In such case the metallic zinc is separated at the cathode, chlorin gas escapes at the anode, and the sulfate of sodium simultaneously formed remains in the solution, from which the salt can be crystallized at a certain concentration. The circulating lye can, however, be removed from the electrolyzer and either be cooled down in refrigerating apparatus or concentrated from time to time in evaporating apparatus. Through these operations the sulfate of sodium crystallizes, and the remaining lye can again be enriched in electrolye salts and in this condition admitted again to the electrolyzer. This simple electrolytic process thus enables us to obtain simultaneously three most valuable products—zinc, chlorin, and sulfate of sodium—and the work of the current is utilized in the most advantageous manner.

I claim—

1. The process of treating roasted sulfid ores of zinc, which consists in converting the zinc compounds therein into sulfites by suitable means, converting the sulfite into a sulfate by a suitable oxidant, treating the sulfate with an alkali metal or alkaline-earth metal chlorid, thereby forming chlorid of zinc and sulfate of an alkali metal, removing the latter and recovering the zinc, substantially as described.

2. The process of treating roasted sulfid ores of zinc, which consists in converting the zinc compound therein into bisulfite of zinc by means of sulfurous acid, converting the bisulfite into sulfate by means of a suitable oxidant, reacting on the sulfate with a chlorid of a metal of the alkalies or alkaline earths, thereby forming chlorid of zinc and sulfate of an alkali metal, crystallizing out the sulfate of alkali and recovering the zinc from the remaining solution, substantially as described.

3. The process of treating roasted sulfid ores of zinc, which consists in converting the zinc compounds therein to zinc bisulfite by means of sulfurous-acid gas, converting the bisulfite into monosulfite by suitable means, returning the sulfurous acid set free into the cycle of operation, oxidizing the monosulfite of zinc to sulfate and reacting on the latter with a suitable chlorid to form chlorid of zinc, and recovering metallic zinc from the solution, substantially as described.

4. The process of treating roasted sulfid ores of zinc, which consists in converting the compounds therein into zinc sulfate by suitable means, reacting on this sulfate with the chlorid of a metal of the alkalies or alkaline earths thereby forming chlorid of zinc and sulfate of an alkali metal, cooling and crystallizing out the sulfate of the metal of the alkalies or alkaline earths and liberating the zinc chlorid from any zinc sodium sulfate that may have formed by means of a suitable carbonate, substantially as described.

5. The process of treating roasted zinc sulfid ores, which consists in converting the zinc compounds into sulfite of zinc by means of sulfurous acid, converting the sulfite into sulfate of zinc, mixing therewith a chlorid of a metal of the alkalies or alkaline earths, thereby forming chlorid of zinc and sulfate of an alkali metal, placing therein suitable electrodes and passing an electric current, thereby depositing zinc at the cathode and liberating chlorin at the anode, substantially as described.

6. The process of treating roasted zinc sulfid ores, which consists in converting the zinc compounds into bisulfite of zinc, converting the latter into monosulfite thereby liberating sulfurous acid, oxidizing the sulfite to sulfate of zinc by means of air, mixing therewith a chlorid of a metal of the alkalies or alkaline earths, thereby forming chlorid of zinc and sulfate of an alkali metal, cooling and crystallizing out the sulfate of the metal of the alkalies or alkaline earths, redissolving the latter and breaking up any double sulfate of zinc and alkali metal by means of alkali-metal carbonate, thereby removing the zinc as carbonate to produce a substantially pure alkali-metal sulfate as a by-product and recovering the zinc from the chlorid solution, substantially as described.

In testimony that I claim the foregoing as my invention I have signed my name in presence of two subscribing witnesses.

CARL KELLNER.

Witnesses:
ALVESTO S. HOGUE,
A. FUNK.